Aug. 7, 1945.      R. M. NARDONE      2,381,362
AIRCRAFT CONTROL
Original Filed Sept. 7, 1939
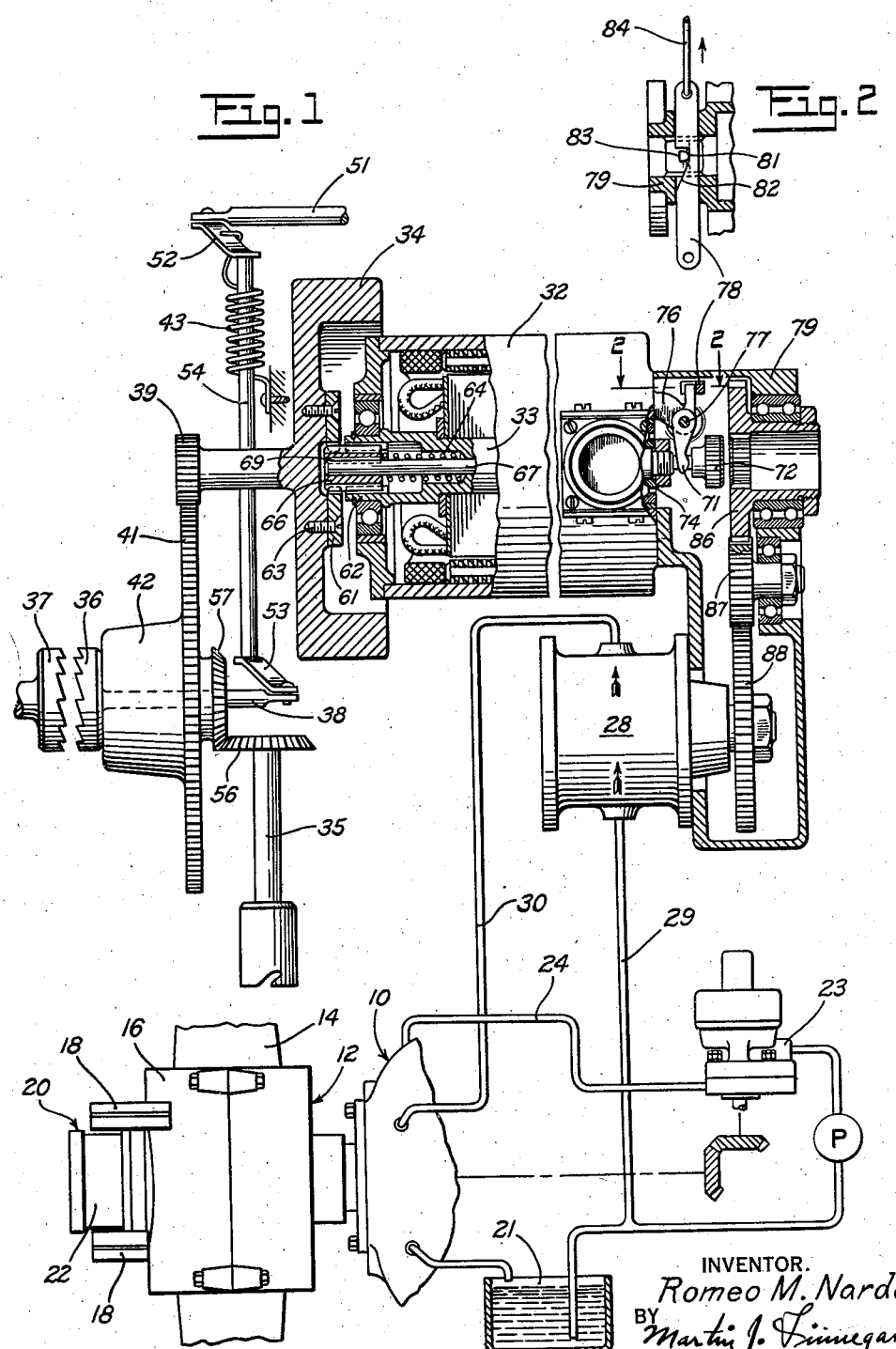
INVENTOR.
Romeo M. Nardone
BY
Martin J. Finnegan
ATTORNEY.

Patented Aug. 7, 1945

UNITED STATES PATENT OFFICE 2,381,362

AIRCRAFT CONTROL

Romeo M. Nardone, Westwood, N. J., assignor to Bendix Aviation Corporation, South Bend, Ind., a corporation of Delaware Original application September 7, 1939, Serial No. 293,818. Divided and this application December 20, 1940, Serial No. 371,047

2 Claims. (Cl. 170—135.6)

This invention relates to aircraft, and particularly to the control of an aircraft engine and the propeller driven thereby.

An object of the invention is to provide novel means for controlling the pitch of the propeller blades.

As the invention is disclosed herein, the control means operates upon a propeller pitch changing mechanism of the character described in Martin Patent No. 2,081,946, and is effective to turn the propeller blades beyond the normal pitch range arc, by reason of the development of considerably higher fluid pressure than that of which the engine driven pump of the Martin patent system would be capable (particularly if there should be a failure of engine parts); the higher pressure being in turn produced by driving a fluid compressor or pump through independent means, as by connection thereof to the armature shaft of a high speed motor such as that commonly incorporated in engine starter mechanism, one such mechanism being illustrated in the accompanying drawing wherein:

Fig. 1 is a diagrammatic view of a system embodying the present invention; and

Fig. 2 is a transverse view along line 2—2 of Fig. 1.

In the various views the numeral 10 generally indicates a power plant of the internal combustion engine type, and including a controllable pitch propeller, generally indicated at 12, having two or more radially disposed blades 14 rotatably mounted at their root or base ends in a hub barrel member 16 for pitch changing movement about their longitudinal axes. The pitch angle of the blades 14 is controlled by a pair of centrifugally actuated counterweights 18 directly connected to the respective blades and a hydraulic mechanism 20 operatively connected to the counterweights; this being the type of pitch changing mechanism disclosed in detail in Martin, et al. patent, above identified.

As in the Martin, et al. patent, the counterweights tend to turn the blades 14 in one direction, and the movable cylinder 22 of the hydraulic mechanism is operative to overcome this tendency and turn the blades in the opposite direction, the hydraulic pressure for this purpose being normally produced through operation of the engine driven pump P pumping oil from the source 21 at a rate which varies according to the setting of a governor operated valve located in a housing 23 and controlling delivery of oil to the conduit 24 leading to the cylinder 22; said valve in housing 23 being preferably identical in structure and mode of operation to the valve 38 illustrated in Fig. 2 of the Martin, et al. patent.

The pressure fluid supplying means just described is sufficient for the normal operation of the propeller, that is, for operation in normal flight, with the associated engine 10 generating power normally and with the pitch of the blades variable over the normal, limited range.

There will next be described the auxiliary pressure fluid supplying means adapted to be brought into operation in an emergency to increase the force applied to cylinder 22 and thereby swing the blades beyond the normal range. As shown, such auxiliary means includes a second pump 28 adapted to receive oil from source 21, as by way of supply pipe 29, and pump such oil to the cylinder 22, as by way of conduit 30. This pump is normally idle, but in an emergency can be energized to operate to develop a pressure far in excess of the capacity of pump P, and from a source of power that is available even though the engine 10 has failed and, in consequence of such failure, is delivering no power whatever.

This source of power for operation of pump 28 is shown in Fig. 1 as involving a high speed electric motor 32 having an armature shaft 33 normally coupled to flywheel 34 of an engine starter mechanism, but adapted to be drivably connected to the pump 28 through operation of coupling linkage indicated in Fig. 2 and also in Fig. 1 just below the section line 2—2. The engine starter includes an engine engaging clutch member 36 and a speed reducing gear train whose high speed end is constituted by a pinion 39 rotatable with flywheel 34, and whose low speed end consists of a gear 41 adapted to rotate a barrel 42 housing a preset clutch of the overload yielding type (such as illustrated in detail in Lansing Patent No. 1,833,948) whereby rotation is imparted to the engine engaging clutch element 36. Movement of the clutch element 36 into engagement with corresponding clutch element 37 of the engine is under the control of axially movable rod 38 passing centrally and slidably through clutch barrel 42 and connecting with clutch member 36 through yieldable means in the aforesaid Lansing patent or directly as indicated. The rod is normally restrained in the clutch retracting position shown by suitable means such as coiled torsion spring 43 corresponding to the coiled torsion spring 106 of the aforesaid Lansing patent, and is movable into the clutch meshing position by manual means, if desired, or by energization of a solenoid whose plunger 51 connects with rod 38 by way of the intervening levers 52 and 53 and the rock shaft 54 about which the spring 43 is coiled. The winding (not shown) of this meshing solenoid may be interposed in a circuit (not shown) from a suitable source, which source and circuit may also include, by means of parallel connections, the windings of the electric motor 32.

In case of motor failure (or if the source of current is temporarily insufficient) the starter may be operated by accelerating the flywheel 34 manually through the instrumentality of the manually rotatable shaft 35 connecting with the starter gear train as indicated at 56 and 57.

As shown in Fig. 1 the connection between the motor armature shaft 33 and the flywheel 34 takes the form of an externally splined sleeve or clutch element 66 normally meshing with two internally splined elements 61 and 62, the former being integrated with the flywheel 34, as by screws 63, and the latter being integrated with the armature shaft 33. A coiled compression spring 64 bears at one end against the base of the socketed part of armature shaft 33, and at its opposite end exerts pressure on clutch element 66 to hold the latter in the meshed position shown. A rod 67 slidably extends through armature shaft 33 and operatively connects with clutch 66 as by means of a key 69, whereby rearward sliding of rod 67 will draw clutch 66 to the right and interrupt driving relationship between armature shaft 33 and flywheel 34, and at the same time establish driving relationship between the said armature shaft 33 and the gear train leading to and operatively connecting with the rotor of the propeller feathering pump 28.

To bring about such rearward movement of rod 67 there is provided a bifurcated lever 71 straddling the rod 67 and abutting the hub of a gear 72 secured by suitable means to the rear end of said rod, where the latter protrudes beyond the bearing and retainer assembly 74 at the rear of armature shaft 33. Supports 76 provide pivotal mounting for lever 71, and a rocking thereof about pivot bearing 77 is effected by reciprocation of a bar at 78. As shown in Figs. 1 and 2 this bar 78 is slidably received in the upper portion 79 of the motor housing and includes a notch 81 having a cam edge 82 (Fig. 2) engageable with the upper end 83 of lever 71 to rock the latter in response to a pull exerted upon the bar actuating cable 84 in the direction of the arrow in Fig. 2. The gear train 86, 87, 88 is thereby coupled for rotation with the armature shaft of the motor 32 and serves to produce rotation of the rotor of the pump 28 at a speed proportional to that of the motor 32, there being preferably some speed reduction therebetween and the gear sizes for the elements 86, 87 and 88 being so chosen as to achieve this end.

This application is a division of my application Serial No. 293,818, filed September 7, 1939.

What I claim is:

1. In combination with an internal combustion engine driven propeller, engine starting means including a motor for imparting initial rotary movement to said propeller, means including a pump for feathering said propeller, means for coupling said motor to said pump to impart rotary movement to the latter, said coupling means including a rod passing through said motor, means for shifting said rod to pump-driving position, and means normally holding said rod in engine starting position.

2. In combination with an internal combustion engine driven propeller, engine starting means for imparting initial rotary movement to said propeller, means including a pump for feathering said propeller, means including a motor for driving said engine starting means and pump, said last-named means including a rod passing through said motor, means for shifting said rod to pump-driving position, and means normally holding said rod in engine starting position.

ROMEO M. NARDONE.